(12) United States Patent
Soltys et al.

(10) Patent No.: US 9,015,915 B1
(45) Date of Patent: Apr. 28, 2015

(54) CONING AND THREADING MACHINE FOR HIGH-PRESSURE TUBING

(76) Inventors: Gregory B. Soltys, Edinboro, PA (US); Brad R. Bilski, Waterford, PA (US)

( * ) Notice: Subject to any disclaimer, the term of this patent is extended or adjusted under 35 U.S.C. 154(b) by 445 days.

(21) Appl. No.: 13/494,453

(22) Filed: Jun. 12, 2012

(51) Int. Cl.
| | | |
|---|---|---|
| *B23P 23/02* | (2006.01) | |
| *B23G 1/22* | (2006.01) | |
| *B23G 1/08* | (2006.01) | |
| *B23G 1/24* | (2006.01) | |
| *B23Q 11/00* | (2006.01) | |
| *B23Q 11/08* | (2006.01) | |
| *B23Q 11/10* | (2006.01) | |

(52) U.S. Cl.
CPC . *B23P 23/02* (2013.01); *B23G 1/08* (2013.01); *B23G 2240/12* (2013.01); *B23G 2240/08* (2013.01); *B23G 1/24* (2013.01); *B23G 1/22* (2013.01); *B23Q 11/0067* (2013.01); *B23Q 11/0891* (2013.01); *B23Q 11/1015* (2013.01); *Y10T 409/30392* (2015.01); *Y10T 409/304032* (2015.01); *Y10T 409/300448* (2015.01); *Y10T 29/5199* (2015.01); *Y10T 29/5174* (2015.01); *Y10T 409/300504* (2015.01); *Y10T 409/304088* (2015.01)

(58) Field of Classification Search
CPC . B23P 23/02; Y10T 29/5199; Y10T 29/5185; Y10T 409/300448; Y10T 409/300504; Y10T 29/5173; Y10T 29/5174
USPC .......... 29/54, 55, 33 T, 33 D; 470/68; 409/72, 409/73
See application file for complete search history.

(56) References Cited

U.S. PATENT DOCUMENTS

| | | | | | |
|---|---|---|---|---|---|
| 3,786,539 | A | * | 1/1974 | Foll et al. ...................... | 29/27 R |
| 4,617,848 | A | * | 10/1986 | Eckle et al. ..................... | 82/159 |
| 4,705,187 | A | * | 11/1987 | Linn .............................. | 220/819 |
| 5,207,134 | A | * | 5/1993 | Wakatsuki ....................... | 82/129 |
| 5,313,694 | A | * | 5/1994 | Yonemoto et al. ............. | 29/27 R |
| 5,800,104 | A | * | 9/1998 | Miyano ......................... | 409/131 |
| 7,674,079 | B2 | * | 3/2010 | Schawe .......................... | 29/33 T |
| 2005/0254912 | A1 | * | 11/2005 | Skrzynski ...................... | 408/226 |

\* cited by examiner

*Primary Examiner* — Erica E Cadugan
(74) *Attorney, Agent, or Firm* — Richard K Thomson

(57) ABSTRACT

A machine permits an end of a thick-walled, high-pressure tubing to be chucked in a collet one time, coned, faced and threaded, using a coning head and threading head which are mounted on a carriage which can be translated laterally between three positions and the coning and threading heads parallel to the longitudinal axis of the workpiece to complete the coning and threading operations.

9 Claims, 9 Drawing Sheets

CONING AND THREADING MACHINE FOR HIGH-PRESSURE TUBING

BACKGROUND AND SUMMARY OF THE INVENTION

The present invention is directed to a device used in threading thick-walled tubing. More particularly, the present invention is directed to a machine for coning and threading the end of a length of high-pressure (>10,000 psi) tubing to enable it to be joined to an adjacent length of tubing or fittings including tees, crosses, elbows, and valves.

The present invention relates to preparing high-pressure tubing (generally stainless steel) for connection using a collar by coning and affixing, by way of example and not limitation, a left-handed thread. High-pressure tubing is used in support equipment for the oil and gas drilling industry, and is also utilized in water jet, water blast, and other industries as well. While coning and threading is fairly easy for ¼" OD tube stock, a machine is needed for tube OD's from ⅜" though 1". The coning and threading machine of the present invention provides for coning, facing, and threading from one end of the machine in one setup operation. Existing coning and threading machines feature a coning head on one end and a threading end on the other. This requires significant manipulation of the high-pressure tubing being machined which is particularly problematic when the attempt is being made in a crowded machine shop with 20' lengths of tube.

The present invention permits the length of tube to be chucked once, coned and threaded without the need for extensive (or actually, any) repositioning of the workpiece. The machine of the present invention comprises a) a collet for receiving a first end of the length of the high-pressure tubing and holding the workpiece aligned with a first axis; b) a coning head for forming a taper on the first end of the tubing; c) a threading head for creating a thread length on the outside diameter on the first end; whereby the first end of the tubing can receive the taper from said coning head, and the thread length from said threading head while engaged in said collet. In the first embodiment, the coning head and the threading head are co-planar and, in fact, ride on a common carriage.

The machine of the present invention includes a first displacement means to move the carriage laterally between a plurality of positions and a second displacement means to move the carriage longitudinally along the first axis. A fixed stop on the machine controls a longitudinal distance the carriage can move. The invention can accommodate a plurality of sized coning blades which are installed in the coning head to accommodate a plurality of diameters of high-pressure tubing. In point of fact, 9 sizes of coning blades are available for each machine. A thread control knob adjusts to one of a plurality of thread lengths for particular diameters of high-pressure tubing. A large removable chip bucket catches metal chips removed during coning and threading operations. Coolant is supplied through the shafts supporting the coning and threading heads. Coolant is also captured in the chip bucket and recirculated to the shafts via a submersible pump.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
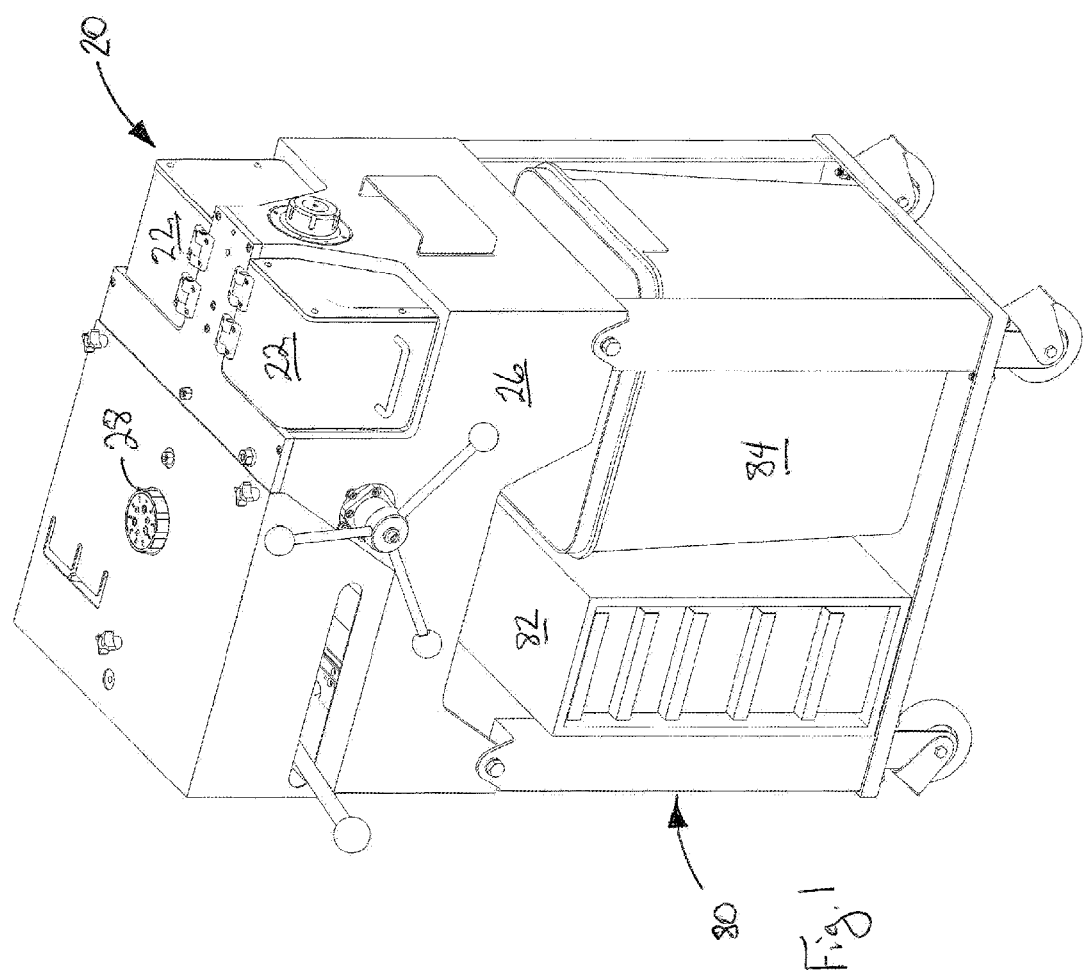
FIG. 1 is a front perspective view of a first embodiment of the coning and threading machine of the present invention mounted on a cart.
Figure 2:
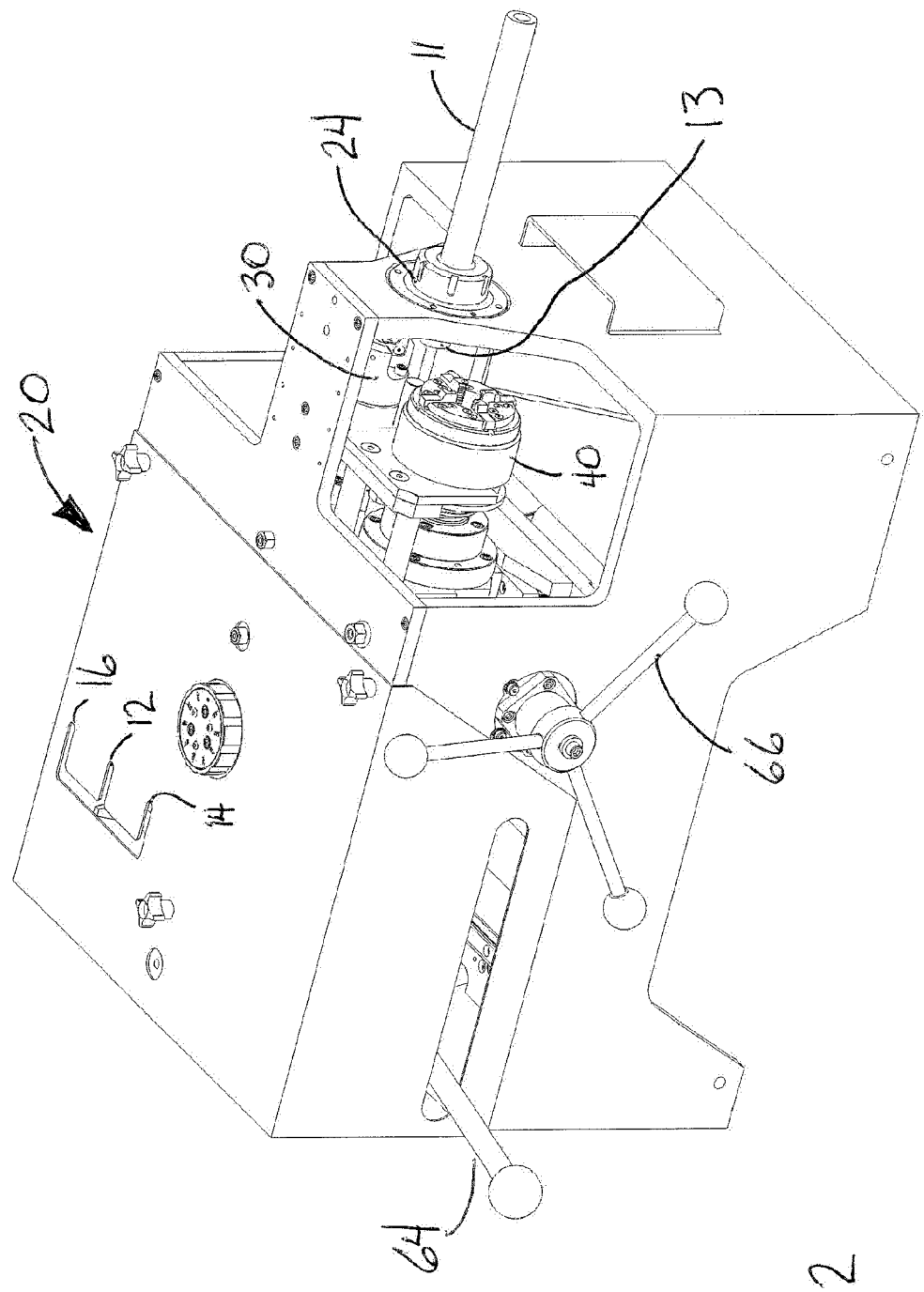
FIG. 2 is a front perspective view of a first embodiment of the coning and threading machine of the present invention.
Figure 3:
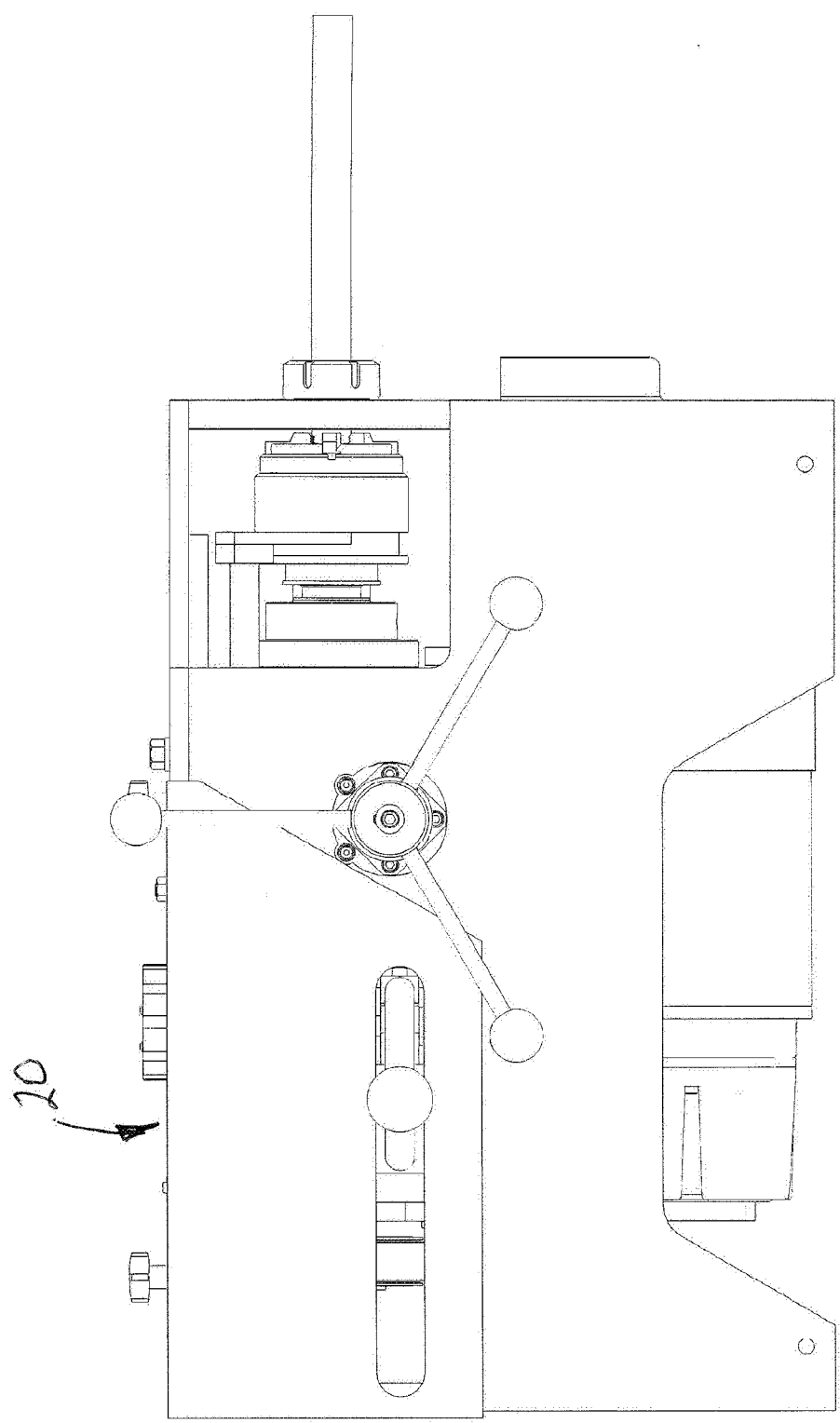
FIG. 3 is a front view of the first embodiment.
Figure 4:
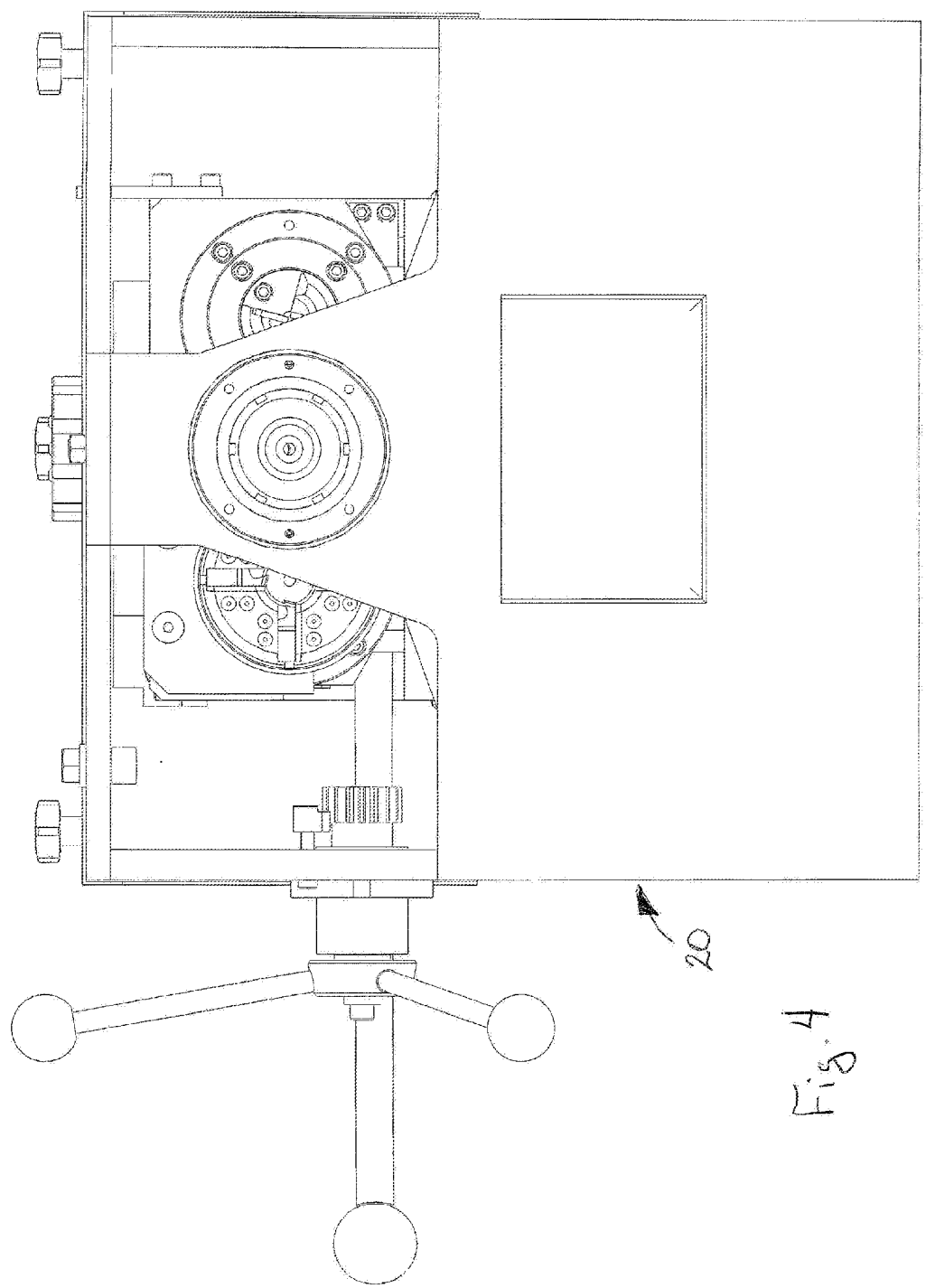
FIG. 4 is an end view of the first embodiment.
Figure 5:
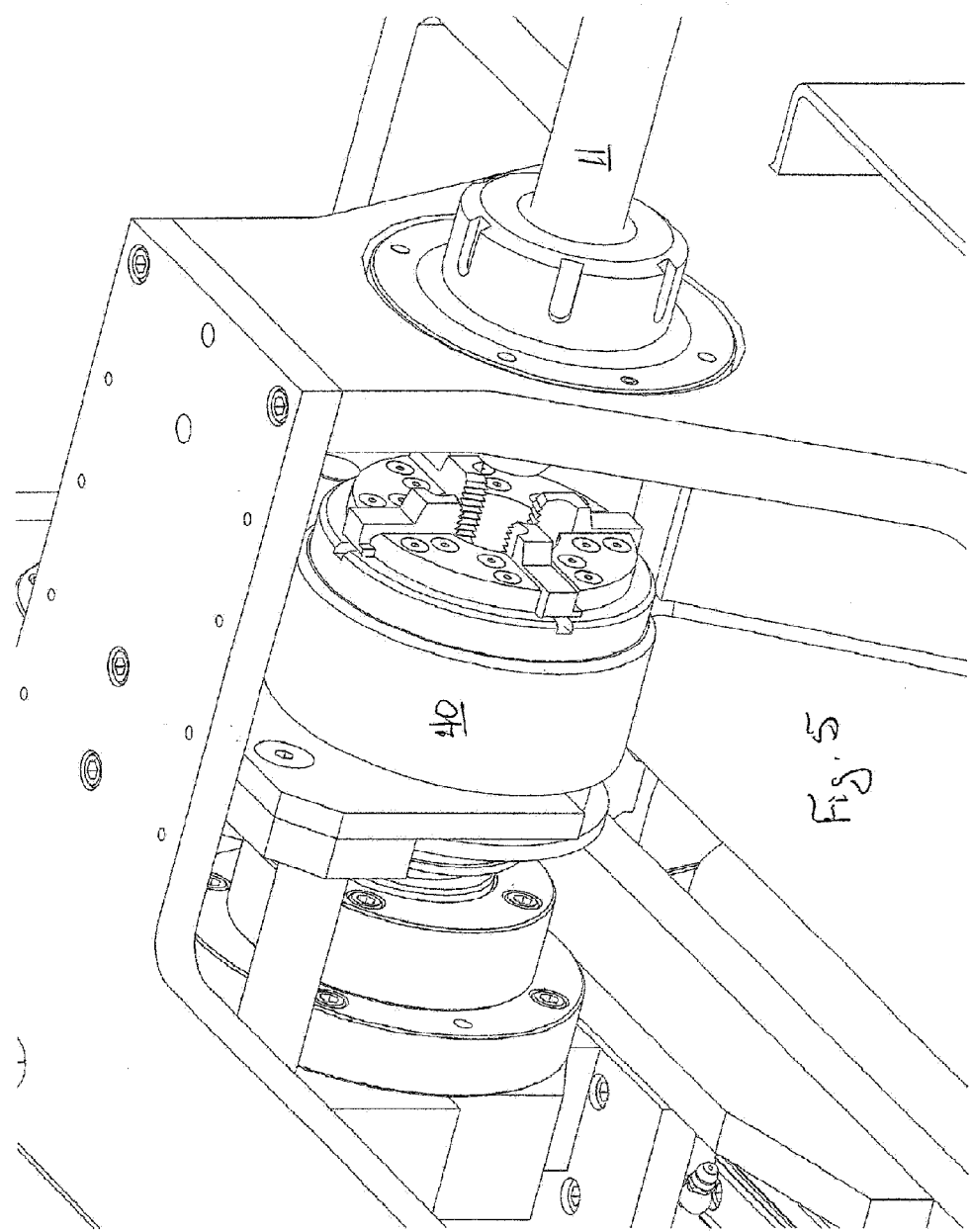
FIG. 5 is a detailed front perspective of the threading head of the first embodiment.
Figure 6:
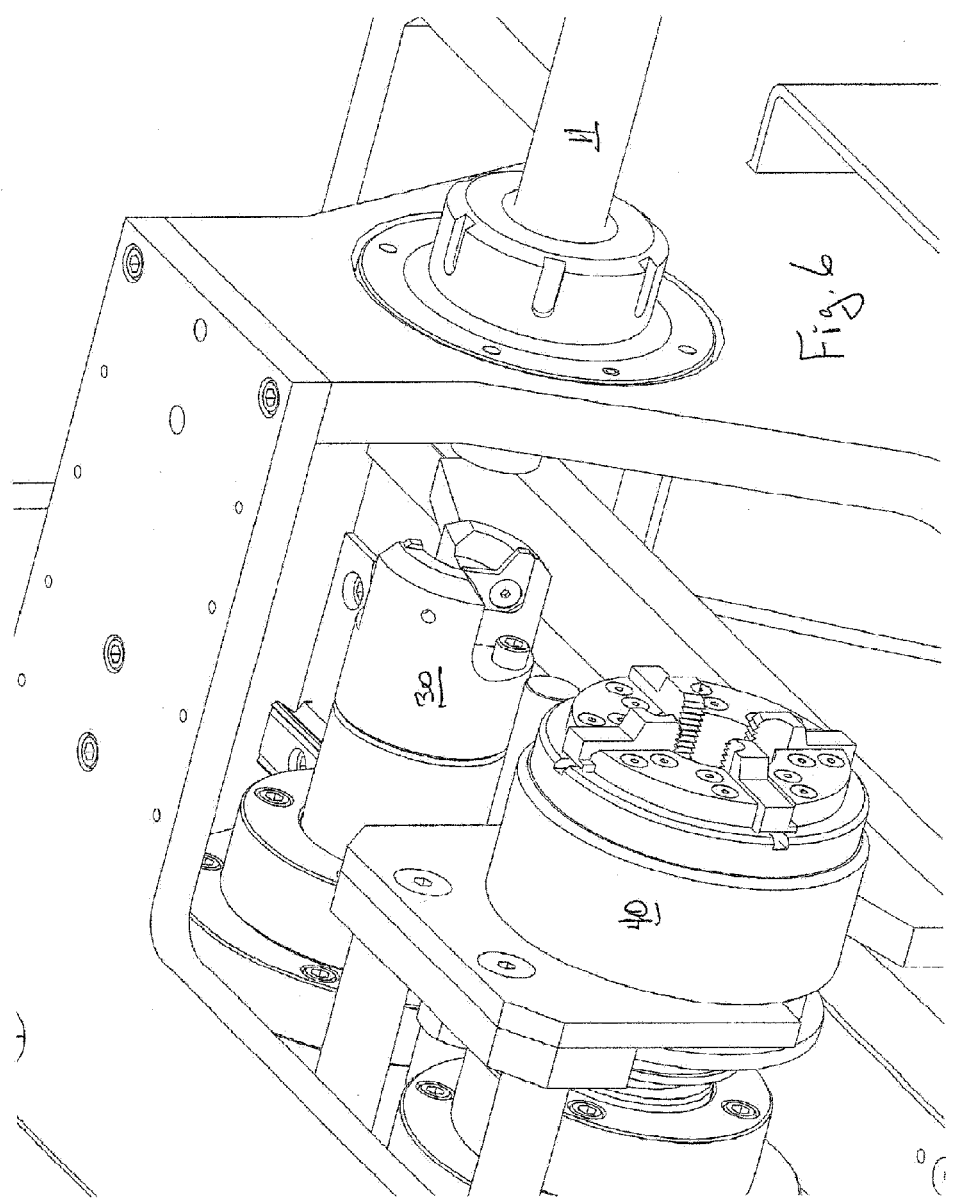
FIG. 6 is a detailed front perspective of the threading and coning heads of the first embodiment.

A first embodiment of the coning and threading machine of the present invention is depicted in FIGS. 1-4 generally at 20. Coning and threading machine 20 (FIG. 2) is preferably mounting on cart 80 (FIG. 1) with storage for a tool box 82 and a place for coolant bucket 84. Shown in FIG. 1, but omitted for clarity from the remaining figures, are a pair of transparent shields 22 pivotally mounted to housing 26 which allow the operator to observe the coning and threading operations safely, protecting her/him from coolant and flying chips removed from the workpiece.

Figure 7:
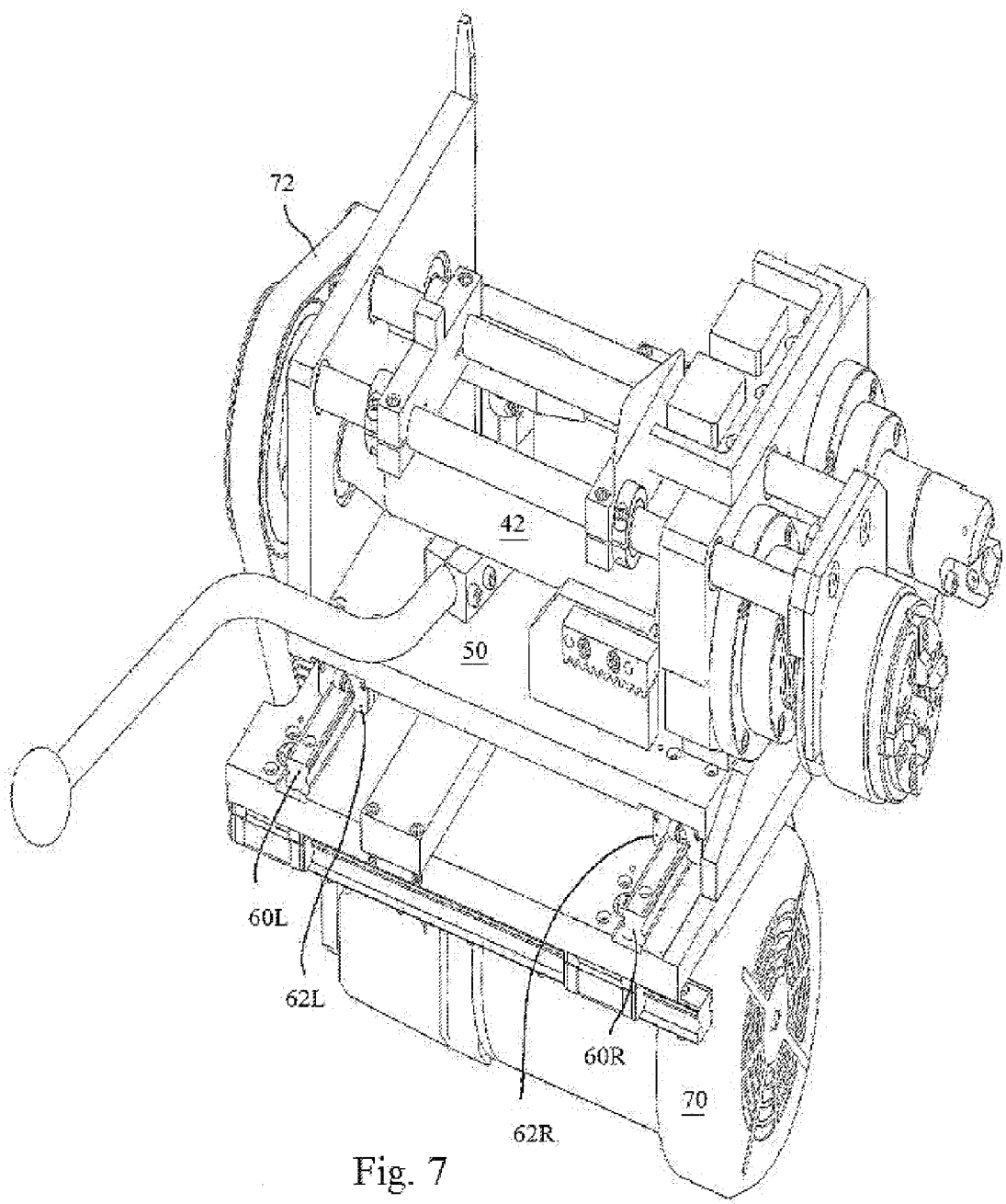
FIG. 7 is a front perspective view of the carriage with the housing removed.
Figure 8:
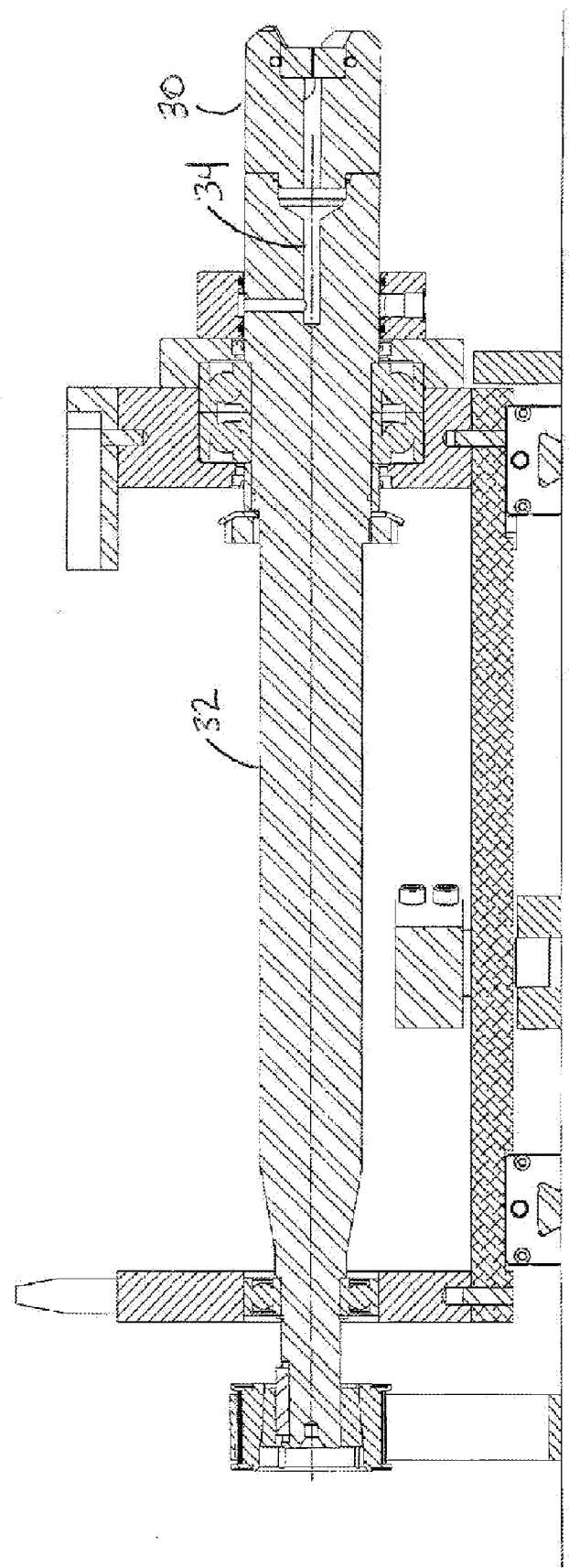
FIG. 8 is a partial cross-sectional side view of the coning shaft of the first embodiment; and, FIG. 9 is a front perspective view of a plurality of sizes of coning heads used with the first embodiment.

As best seen in FIG. 7, coning head 30 and threading head 40 are mounted on carriage 50 which is mounted for lateral movement on dovetail rails 60L and 60R by followers 62L and 62R, respectively. Movement is effected by manipulation of translating handle 64 (FIG. 2) between a center position 12 for insertion of workpiece 11 in collet 24, a forward position for coning 14 in which coning head 30 is aligned with workpiece 11 and a rear position 16 in which threading head 40 is aligned with workpiece 11. Rotation of handle 66 (FIG. 2) moves coning head 30 and threading head 40 longitudinally along a second set of dovetail rails (not shown) into engagement with workpiece 11. Motor 70 provides counterclockwise rotation of coning head 30 and threading head 40 by means of serpentine belt 72. Adjustment knob 28 atop housing 26 is provided with indicia for the respective tubing diameters and proper adjustment of knob 28 provides the proper length of thread on the end 13 of workpiece 11 following the coning operation. Coolant is pumped through a passageway 34 in the shaft 32 mounting coning head 30 (FIG. 8) and through a similar passageway in shaft 42 mounting threading head 40 to enable the proper amount of coolant to arrive at the point it is most needed: where the coning and threading dies are engaging workpiece 11. A plurality of sizes (9 sets total) of coning dies 38 (FIG. 9, three shown) are provided for the nine different sizes/types of pipe being coned. Retraction of threading head 40 via lever handle 64 following the threading operation automatically resets the threading dies for the next workpiece 11.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A machine for coning and threading an end of a length of high-pressure tubing, each length of tubing having a primary longitudinal axis corresponding with its center and running throughout its length, said machine comprising:
   a) a collet for receiving a first end of the length of the high-pressure tubing and holding the primary longitudinal axis of each length of tubing aligned with and centered on a first axis of said collet;
   b) a carriage mounted upon a frame for both longitudinal and lateral movement, said carriage mounting
      i) a coning head for forming a taper on the first end of the tubing;
      ii) a threading head for creating a thread length on the taper formed by said coning head on the first end;
   c) a translation handle for positioning said carriage in one of three locations:
      i) a first central location where said collet is loaded;
      ii) a second location spaced laterally from said first central location in a first direction, in which second location said coning head is aligned with the primary axis of the length of tubing being held in said collet;
      iii) a third location spaced laterally from said first central location in a second opposite direction from said second location, in which third location said threading head is aligned with the primary axis of the length of tubing being held in said collet;
   whereby the first end of the tubing can be tapered by said coning head, and threaded by said threading head while engaged in said collet without the need to be repositioned in said collet.

2. The machine of claim 1 wherein said collet, said coning head and said threading head are co-planar.

3. The machine of claim 2 further comprising displacement means to move said carriage longitudinally in a direction which is coaxial with said first axis.

4. The machine of claim 1 wherein said coning head further comprises a plurality of sets of coning dies which are replaceably installed in said coning head, each set of coning dies being capable of accommodating one particular diameter of high-pressure tubing.

5. The machine of claim 1 further comprising a thread control knob having a plurality of indicia indicating lengths of tubing to be threaded for various diameters of high-pressure tubing.

6. The machine of claim 1 further comprising a removable chip bucket for catching a) cutting oil allowing re-circulation and b) metal chips removed during coning and threading.

7. The machine of claim 1 further comprising a coning shaft for supporting said coning head, said machine having coolant supply means through said coning shaft.

8. The machine of claim 7 further comprising a threading shaft for supporting said threading head, said machine having coolant supply means through said threading shaft.

9. The machine of claim 1 further comprising at least one pivotable transparent shield positioned between said coning head and an operator and said threading head and the operator to protect the operator from flying chips removed from the length of tubing.

* * * * *